(12) United States Patent
Palanciuc et al.

(10) Patent No.: US 10,110,435 B2
(45) Date of Patent: Oct. 23, 2018

(54) TECHNIQUES FOR ASSOCIATING VARIABLE VERSIONS OF A CLUSTER OF DEVICES IDENTIFIED AT DIFFERENT TIMES WITH THE SAME USER BY ASSIGNING CLUSTER IDENTIFIERS

(71) Applicant: Adobe Systems Incorporated, San Jose, CA (US)

(72) Inventors: Virgil-Artimon Palanciuc, Bucharest (RO); Edward Schuchardt, New York, NY (US); Charles Menguy, New York, NY (US); Mihai Daniel Fecioru, Bucharest (RO); David Weinstein, Rockville Centre, NY (US)

(73) Assignee: Adobe Systems Incorporated, San Jose, CA (US)

( * ) Notice: Subject to any disclaimer, the term of this patent is extended or adjusted under 35 U.S.C. 154(b) by 175 days.

(21) Appl. No.: 14/937,246

(22) Filed: Nov. 10, 2015

(65) Prior Publication Data

US 2017/0134232 A1   May 11, 2017

(51) Int. Cl.
*G06F 15/177*   (2006.01)
*H04L 12/24*   (2006.01)

(52) U.S. Cl.
CPC ...... *H04L 41/0893* (2013.01); *H04L 41/0816* (2013.01)

(58) Field of Classification Search
CPC .................. H04L 41/0893; H04L 41/0816
See application file for complete search history.

(56) References Cited

U.S. PATENT DOCUMENTS

| | | | | |
|---|---|---|---|---|
| 2008/0285464 | A1* | 11/2008 | Katzir | H04L 63/1408 370/241 |
| 2015/0324847 | A1* | 11/2015 | Bonzi | G06Q 30/0247 705/14.54 |
| 2016/0224901 | A1* | 8/2016 | Scarr | H04L 67/22 |
| 2016/0323239 | A1* | 11/2016 | Cheng | G06Q 30/02 |
| 2017/0078415 | A1* | 3/2017 | Wang | H04L 67/22 |

* cited by examiner

Primary Examiner — Padma Mundur
(74) Attorney, Agent, or Firm — Kilpatrick Townsend & Stockton LLP

(57) ABSTRACT

Systems and methods are provided for identifying stable attributes in clusters of devices and naming the clusters of devices using the stable attributes. The stable attribute is selected from data associated with user/household behavior and data associated with each device. Because the stable attribute is associated with the device in the cluster determined to be the most stable, it is a persistent identifier that can be used to identify the user/household over time. Because the stable attribute is determined each time the clusters are determined, resources that would be required to track the user/household over time are saved and the system of tracking users/households is more efficient. Attributes evaluated to determine the stable attribute include IP address, the location of the device, hardware characteristics of the device, the date a CRM profile was created, timestamp of the first or last user authentication, and the number of authentications on that device.

20 Claims, 9 Drawing Sheets

TECHNIQUES FOR ASSOCIATING VARIABLE VERSIONS OF A CLUSTER OF DEVICES IDENTIFIED AT DIFFERENT TIMES WITH THE SAME USER BY ASSIGNING CLUSTER IDENTIFIERS

FIELD OF THE INVENTION

This disclosure relates generally to computer-implemented methods and systems and more particularly relates to improving the efficiency and effectiveness of computing systems used in associating devices with users so that tracked user interactions on different devices at different times can be associated with the same user.

BACKGROUND

User interactions with e-mail, webpages, and other electronic content are tracked and used to facilitate digital marketing functions. Such user interactions are commonly associated with the particular user devices on which they occur. Various techniques have attempted to identify user devices that are related to one another. For example, devices that are expected to be private devices used by a particular user, e.g., a particular individual or household have been identified using probabilistic signals. Identifying such a cluster of devices allows interactions on different devices to be attributed with a particular user, which improves user analytics and advertisement targeting.

One problem, however, is that the techniques used to identify clusters of user devices provide different results over time. For example, differing results occur based on users temporarily or permanently changing residences, buying new devices, losing devices, and selling devices, among numerous other reasons. In one example, based on a first week's data, one cluster has devices 1, 2, and 3 and another cluster has devices 4 and 5 and, based on a second week's data, one cluster has devices 1 and 3, and another cluster has devices 2, 4, and 5. Existing techniques do not adequately determine that clusters of devices identified at different time periods are for the same user. For example, existing techniques do not adequately determine whether the cluster from the first week with devices 1, 2, and 3 and the cluster from the second week with devices 1 and 3 are the same cluster, i.e., whether the devices should be associated with a single user or different users.

SUMMARY

In an environment in which devices are intermittently grouped into clusters, systems and methods are disclosed for assigning a stable cluster identifier to devices in a cluster. The techniques receive information about devices in a cluster, wherein the devices were determined to be in the cluster based on determining that the devices are expected to be private devices used by a particular user. The techniques identify a stable attribute in the information about the devices in the cluster, wherein the stable attribute is identified based on the stable attribute being more likely than another attribute in the information to be present in subsequent cluster device information for the same particular user. The techniques assign a cluster identifier to the devices in the cluster based on the stable attribute.

These illustrative embodiments and features are mentioned not to limit or define the disclosure, but to provide examples to aid understanding thereof. Additional embodiments are discussed in the Detailed Description, and further description is provided there.

DETAILED DESCRIPTION

Figure 1:
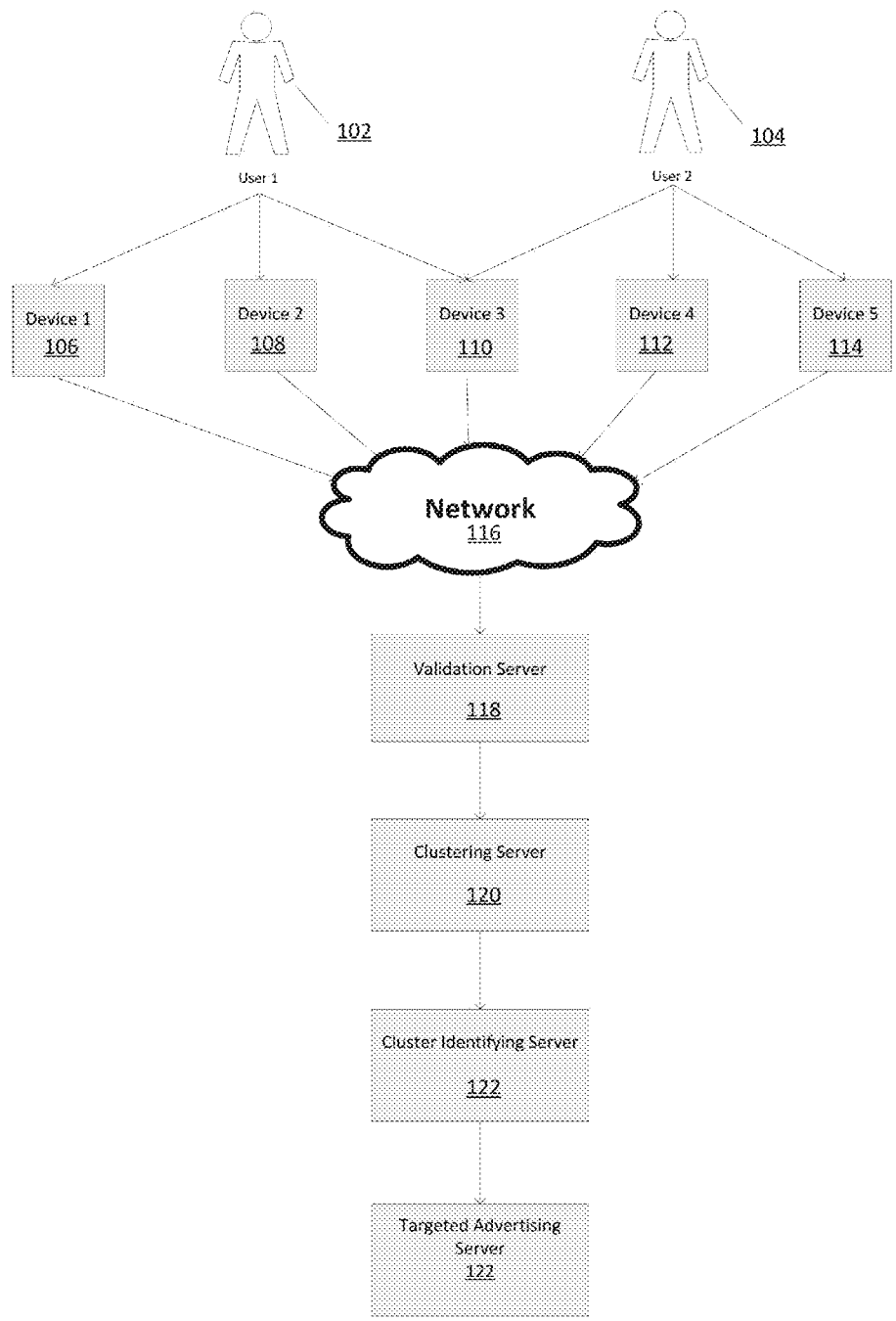
FIG. 1 is a block diagram depicting an example of a system for producing persistent anonymous user identifiers for anonymous users using multiple devices.

Techniques are disclosed for determining that clusters of devices identified at different time periods are for the same user. This allows interaction data collected over time to be associated with a particular user even though the devices of the user, and the usage of the devices by various users, change over time. One embodiment assigns a cluster identifier to clusters using a stable attribute of the devices in the cluster. The stable attribute is something about the devices that is expected to be stable over time for devices of a particular user. The stable attribute is based on metadata assigned to the devices (e.g., IP address, timestamp of the first/last user authentication, number of authentications, etc.). For example, such metadata can be used to give each device a device rank (reflecting the device's stability in the cluster) and the cluster named using the most highly-ranked, i.e., stable, device. As a specific example, in a cluster of devices 1, 2, and 3, device 1 is the device in the cluster with the oldest user authentication and thus used to label the cluster C1. The following week, a cluster includes devices 1, 2, and 4, and the cluster is again given the label C1 based on device 1 having the oldest user authentication of devices 1, 2, and 4. In this example, the device considered the most representative for the current cluster, e.g., device 1, is used to name the cluster based on the assumption that the probability for that device to migrate from this cluster to another is the smallest compared with the rest of the devices in the cluster. Various other attributes or combinations of attributes of the devices can be used as a stable attribute used to name a cluster.

Using a stable attribute to name clusters allows clusters associated with a particular user to be more accurately associated over time as the devices of the user change. As described above, existing attempts to cluster devices associated with a particular user generate differing clusters of devices for different time periods, as a result of users temporarily or permanently changing residences and users buying new devices, losing devices, and selling devices, among numerous other reasons. Using such metadata also allows clusters of devices identified at different time periods to be associated while maintaining the anonymity of the users. This enables clustering data to be shared with relative confidence that the cluster identity will remain constant and will match the set of data collected regarding the user, even when personally-identifiable information is not available.

One embodiment uses a stable attribute from one of the devices in a cluster to identify whether the cluster is for the same user as a version of the cluster in a prior time period. The stable attribute is used to assign a cluster identifier to the cluster (i.e., name the cluster) and, if the cluster identifier matches the cluster identifier of the prior version of the cluster from the prior time period, the cluster and prior version of the cluster are considered to be for the same user. The stable attribute is selected in a way that makes it likely that cluster identifiers will match when cluster versions from different time periods are for the same user. In one specific example, a user uses various devices, such as a personal computer, a notebook, a smart phone, a borrowed computer, and a work computer. The device that is considered to be the most stable according to a set of criteria will serve as the basis of the cluster identifier. Less stable devices are more likely to be replaced over time or to not belong to the user and therefore be used infrequently. Therefore less stable devices are likely to not be a device that provides a reliable identifier of the cluster over time.

In one embodiment, the stable attribute name is identified by identifying the most stable device in the cluster and using an attribute of that device. In one example, the "device name" attribute of the most stable device is used as the cluster identifier. In another example, the "prior cluster identifier" of the most stable device is used as the cluster name. It is beneficial for clusters to be assigned cluster identifiers based on an attribute of the most stable device for various reasons. Doing so avoids more computationally intensive techniques that would attempt to compare one cluster to another cluster to determine if the clusters are related to the same user. By simply using a stable attribute of the most stable device as a cluster identifier, the technique of this embodiment does not have to compare clusters over time to evaluate characteristics of the cluster to determine if the cluster associated with a set of devices at a certain time period is the same as another cluster (i.e., a prior version of the cluster) associated with a set of devices at a different time period. Over time, assigning cluster identifiers to the devices of the cluster results in the devices of cluster having a consistent cluster identifier.

In one embodiment, the attributes are evaluated to determine which device is the most stable include IP address, the date the CRM profile was created, the timestamp of the first or last user authentication within the cluster, and/or the number of times the user was authenticated on that device. In one embodiment, the technique considers the device with the most stable IP address to likely be a device on a household network and thus considered to be a stable device because it is less likely to be replaced than a device that travels with a user. In another example, the device with a timestamp of the first user authentication is likely to be the device that has been owned the longest by that user and thus considered to be a stable device. In another example, the device with a timestamp of the last user authentication is likely to be the newest device for that user and thus considered to be a stable device because it is less likely to be replaced than an older device. In another example, the device with a high number of authentications is likely to be owned by the user, as opposed to borrowed devices or devices owned by the user's employer. Such a device in this example is considered to be a stable device because the user is expected to use the personally owned device for the longest period of time. Other attributes to indicate the stability of devices and rationales for using the various attributes device are possible. The stability of a device is determined using a single attribute or a combination of attributes depending upon the circumstances and criteria of the particular implementation of the invention. In one implementation, the attributes used to evaluate the stability of a device change over time.

Some attributes used to determine the stability of a device may be specific to the device itself, such as the IP address, location of the device, or similar attributes. Other attributes used to determine the stability of a device are only meaningful when device information is paired with behavioral information, such as the time stamp of an authentication or the number or frequency of authentications on a particular device.

In some embodiments, clusters and prior clusters are determined to be associated with a particular user (i.e., to be different versions of the same cluster) while keeping the actual identity anonymous. Because user actions performed on a device in a cluster, even if it is anonymous, is associated with the device that is determined to be the most stable, the user's habits can be tracked and shared with confidence that the cluster represents the same user over time. If the anonymity of the user prevents the determination of some attributes, other attributes can be used to identify the most stable device and name the cluster.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the term "user" refers to an individual or household that accesses electronic content using one or more devices.

As used herein, the term "device" refers to an electronic apparatus used to access electronic content. Examples of devices include, but are not limited to, a desktop computer, a laptop, a tablet, a cell phone, a wearable electronic device such as a watch, and other smart objects with network connectivity according to the Internet of Things, such as appliances, including ovens, refrigerators, televisions, air conditioners, thermostats, after-market products to make appliances smart, etc. A particular user owns or uses one device or many devices. Each device can be used to perform particular functions, or the devices can have overlapping functions. Devices can be connected via the internet or a private network, on a wired or wireless connection.

As used herein the term "private device" refers to a device that is expected to be used exclusively or almost exclusively by a particular user. A home computer, mobile phone, and tablet used almost exclusively by a user are examples of private devices. A shared desktop computer in a school library is not a private device.

As used herein, the term "cluster" refers to a group of devices expected to be associated with a particular user. Various methods are used to determine that the devices belong to a cluster. A cluster may be composed of devices that are expected to be associated with a particular user, devices that are not expected to be associated with a particular user, or a combination of devices that are and are not expected to be associated with a particular user. A cluster may be composed of devices that are actually physically clustered, such as devices on a particular wired network. A cluster may also be composed of devices that are not actually physically clustered, either because the devices are connected wirelessly or because they are on multiple wired or wireless networks. When the devices are not actually physically clustered, they may be treated as though they are physically clustered. A cluster of devices that are not physically clustered can be thought of as a virtual cluster.

As used herein, the term "stable attribute" is an item of information stored or known about a device of cluster of devices that is more likely than another attribute to be present in a subsequent cluster of devices for the same particular user.

Referring now to the drawings, FIG. 1 is a block diagram depicting an example of a system for producing persistent anonymous user identifiers for anonymous users using multiple devices. Each of User 1 102 and User 2 104 represent users that access electronic content using one or more devices. Device 1 106, Device 2 108, Device 3 110, Device 4 112, and Device 5 114, represent devices that are used by User 1 102 and User 2 104 to access the Network 116, such as the Internet. In this example, User 1 102 accesses the Network 116 with Device 1 106, Device 2 108, and Device 3 110; and User 2 104 accesses the Network 116 with Device 3 110, Device 4 112, and Device 5 114. Both User 1 102 and User 2 104 access the Network 116 with Device 3 110. It is possible for users to use any number of devices. It is also possible for each device to be shared by any number of users.

Validation Server 118 identifies the users, in this case User 1 102 and User 2 104, accessing the Network 116. Validation Server 118 identifies users, for example, based on the creation of a CRM profile, authentication of a log-in and password, the sender of an email, or the information contained in a cookie, etc. One or more identified users are anonymous in one embodiment. The date-time stamp of each authentication on each device in a cluster is used to determine which device in the cluster is the most stable.

Clustering Server 120 builds clusters of devices likely to be associated with a particular user. In this example, Device 1 106, Device 2 108, and Device 3 110 are associated with User 1 102; and Device 4 112 and Device 5 114 are associated with User 2 104. Depending on the clustering algorithm used and the weights given to the various attributes, Device 3 110 is placed in the cluster for User 1 102 or User 2 104.

Cluster Identifying Server 122 examines the attributes of the devices in each cluster and selects the most stable device in the cluster. Cluster Identifying Server 122 then names each cluster based on the most stable device. Cluster Identifying Server 122 stores the cluster identifier for each device in each iteration. In later iterations of the cluster naming algorithm, the previous cluster identifier for the most stable device is considered in the selection of a cluster identifier.

Targeted Advertising Server 122 delivers advertisements to the devices associated with each cluster. The advertisements are targeted based on the user behavior across the devices in the cluster. Because the clustering algorithm was used, advertisers will be able to reach User 1 102 or User 2 104 no matter which device User 1 102 or User 2 104 is using, as long as the user is using a device in the cluster. Other applications of the clustering algorithm are possible.

Figure 2:
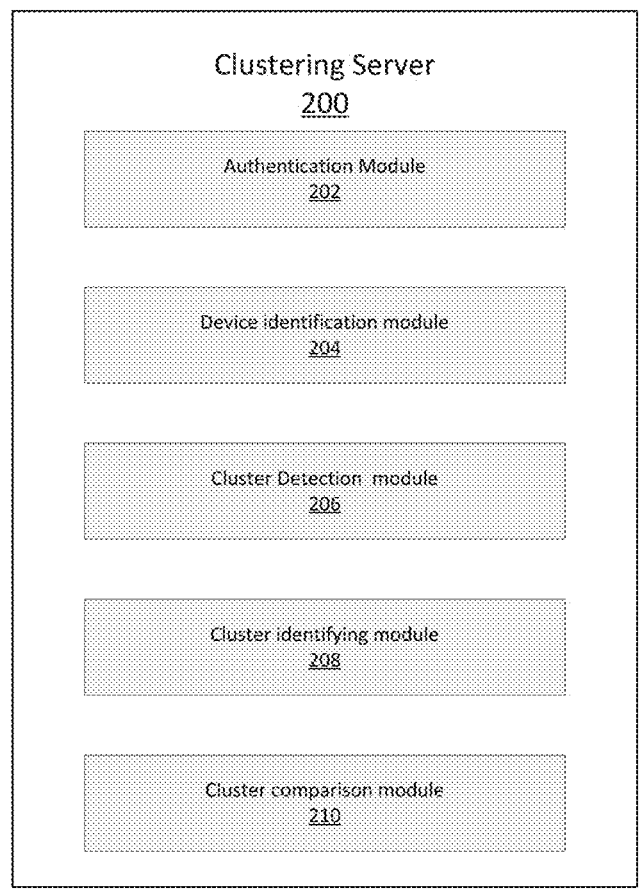
FIG. 2 is a block diagram illustrating exemplary modules for implementing functions in clustering Server in FIG. 1.

FIG. 2 is a block diagram illustrating exemplary modules for implementing functions in Clustering Server 120 of FIG. 1. Similar modules could additionally or alternatively be used in Clustering Server 120 of FIG. 1. The Clustering Server 120 includes modules 202, 204, 206, and 208, which each are implemented by a processor executing stored computer instructions. Authentication Module 202 provides one or more methods to identify users accessing the network using information known about or supplied by each user. Authentication Module 202 also collects metadata for each authentication, such as the date a CRM profile was created or the time of the authentication.

Device Identification Module 204 analyzes information known about each device to identify distinct devices. Each device will be associated with at least one user. The Device Identification Module 204 also seeks to identify information about the device in each user—device pairing, such as the IP address of the device, the location of the device, hardware characteristics of the device, etc., when such information is available.

Cluster Detection Module 206 analyzes the information gathered regarding each authentication and each device associated with each authentication to determine when clusters of devices are present. Such processing involves comparing the authentication and device criteria to metadata stored for clusters previously known to exist.

Cluster Identifying Module 208 analyzes the gathered information for each device in each cluster to determine the most stable device according to specified criteria. It names each cluster with a cluster identifier determined based on an attribute of the most stable device.

The information analyzed by the Cluster Identifying Module 208 to determine which device is the most stable includes the IP address of each device, the date a CRM profile was created on a device, the timestamp of the first or last user authentication on the various devices within the cluster, and/or the number of times a user was authenticated on that device. In one example, the device with the most stable IP address is determined to be a device on a household network and is thus considered to be a stable device because it is less likely to be replaced than a device that travels with a user. In another example, the device with a timestamp of the first user authentication is likely to be the device that has been owned the longest by that user and is thus considered to be a stable device. In another example, the device with a timestamp of the most recent user authentication is likely to be the newest device for that user and is thus considered to be a stable device because it is less likely to be replaced than an older device. In another example, the device with the highest number of authentications is likely to be owned by the user, as opposed to being a borrowed device or a device owned by the user's employer. Such a device in this example is considered to be a stable device because the user is expected to use the personally owned device for the longest period of time. Other attributes to indicate the stability of devices and rationales for using the various attributes are possible.

The stability of a device is determined by the Cluster Identifying Module 208 using a single attribute or a combination of attributes, depending upon the circumstances and criteria of the particular implementation of the invention. In one example, the attributes used to evaluate the stability of a device change over time.

Some of the attributes used by the Cluster Identifying Module 208 to determine the stability of a device may be specific to the device itself, such as the IP address, location of the device, or similar attributes. Other attributes used to determine the stability of a device are only meaningful when device information is paired with behavioral information, such as the time stamp of an authentication or the number or frequency of authentications on a particular device.

The Cluster Comparison Module 210 compares previously identified clusters with currently identified clusters to determine how the clusters evolve over time. For example, if cluster named for D1 on Oct. 1, 2015 has three devices, D1, D2, and D3, and a cluster named for D1 on Nov. 1, 2015 has four devices, D1, D2, D3, and D4, the Cluster Comparison Module 210 determines that the version of cluster D1 identified on Oct. 1, 2015 belongs to the same user as the version of cluster D1 identified on Nov. 1, 2015. The Cluster Comparison Module 210 is able to determine that during the elapsed time period, the user obtained an additional device, D4.

The Cluster Comparison Module 210 also is able to determine that an ensuing cluster is associated with the same user and should therefore be known by the same identifier as an earlier version of the cluster when the stable device is retired. For example, if cluster C3 named for D1 on Jan. 1, 2015 has three devices, D1, D2, and D3, and cluster C4 named for D3 on Jun. 20, 2015 has three devices, D2, D3, and D4, the Cluster Comparison Module 210 determines that C4 is an evolution of C3. The Cluster Comparison Module 210 is able to make this determination based on common characteristics between the two versions of the cluster, including the devices in common, D2 and D4, the date-time stamp of user authentications, and the other factors discussed throughout this application. When such a determination is made, in one example, the Cluster Comparison Module 210 will rename the ensuing cluster to D1 for the sake of continuity, although device D1 has been retired. In another example, the Cluster Comparison Module 210 will link clusters D1 and D3 and maintain the cluster identifier according to the most stable device in that cluster. The link will indicate the relationship between the two clusters.

Figure 3:
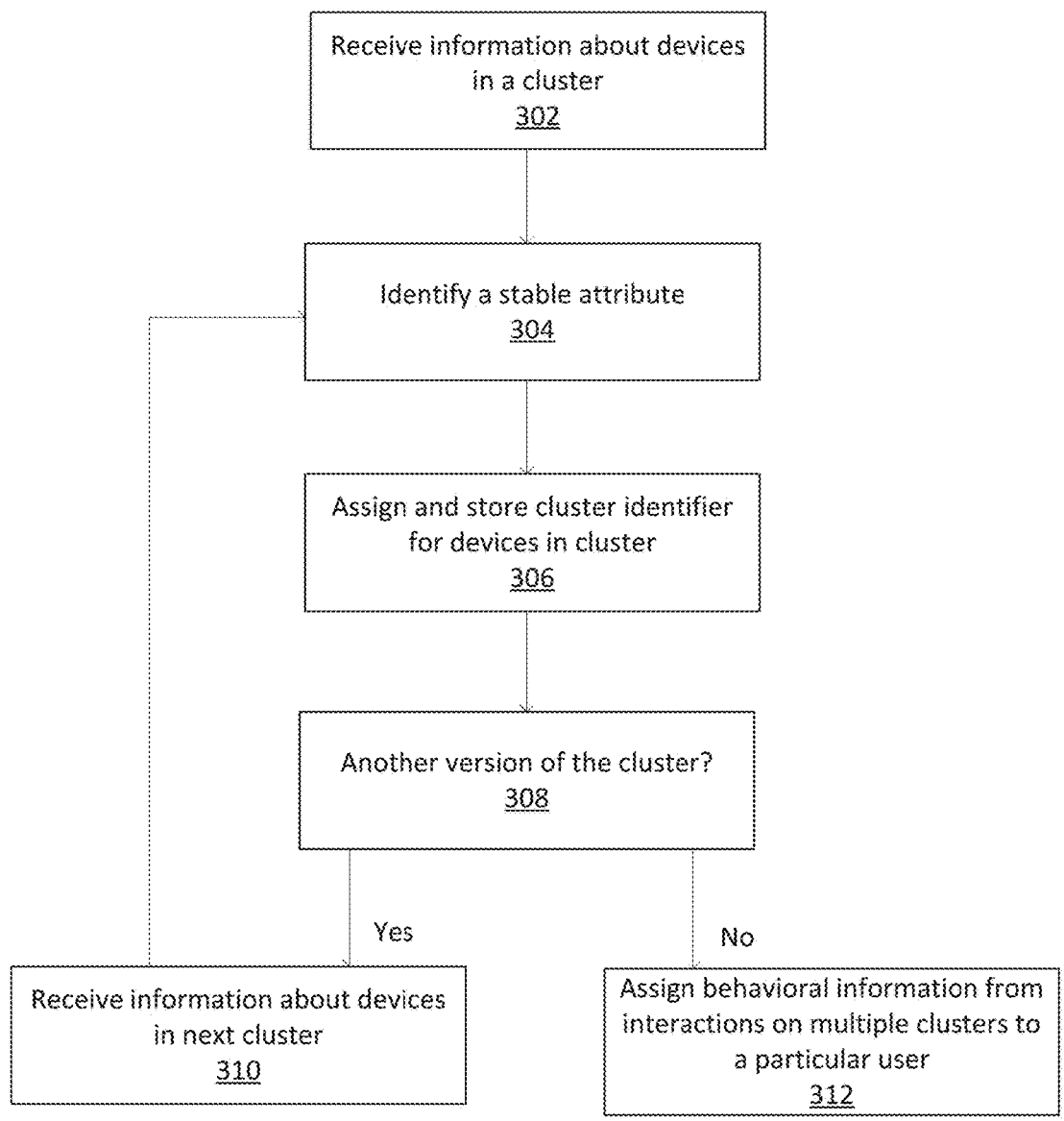
FIG. 3 is a flowchart of an exemplary process for assigning of a stable cluster identifier to devices in a cluster.

FIG. 3 is a flowchart of an exemplary process 300 for the assigning of a stable attribute as a cluster identifier to devices in a cluster. The invention operates in an environment in which devices are intermittently grouped into clusters.

In 302, information about devices in a cluster is received, wherein the devices were determined be in the cluster based on determining that the devices are expected to be private devices used by a particular user. The information includes various attributes including, as discussed above, IP address, the location of the device, hardware characteristics of the device, the date a CRM profile was created, timestamp of the first or last user authentication, the number of authentications by the user on that device, the date the device was first detected, etc. In one example, the particular user of the devices in the cluster is anonymous. The attributes are collected and stored at various times throughout the life of the cluster. The IP address is collected and stored when the device joins the network. The location of the device is able to be determined in multiple ways, such as determining a general location based on the IP address or determining a more specific location based on information associated with a CRM profile. The hardware characteristics of the device are collected when the device joins the network or when the device downloads a piece of content. Information associated with a CRM profile is collected at the time of the CRM profile creation or authentication. The timestamp of the first or last user authentication, the number of authentications by the user on that device, and the date the device was first detected are collected throughout the life of the cluster.

In 304, a stable attribute is identified for the cluster by evaluating the attributes for each device in the information stored for each device in the cluster. The stable attribute is identified based on the stable attribute being more likely than another to be present in subsequent cluster device information for the same particular user. The stable attribute can also be thought of as a persistent attribute. In one example, the stable attribute is the date the device was first detected. In another example, the stable attribute is the device in the cluster detected the most number of times. In another example, the stable attribute is from a device associated with the earliest created CRM profile in the cluster.

In 306, an identifier is assigned as a cluster identifier for the devices of the cluster based on the stable attribute. In one example, the cluster identifier and its associated devices are stored. In another example, the cluster identifier is temporarily stored in the information collected for each device. Storing the stable identifier in a way that each device can be associated with it enables the user's activity that is tracked on any of the devices to be associated with the same user.

In 308, the system checks to see if there is information available regarding another version of the cluster. The system will iterate through various versions of the cluster to identify subsequent versions of the same cluster.

In 310, information about devices in another version of the cluster is also received including the various attributes such as IP address, the location of the device, hardware characteristics of the device, the date a CRM profile was created, timestamp of the first or last user authentication, the number of authentications on that device, etc. The system then returns to identify a stable attribute for this version of the cluster and assign a stable identifier to the devices in the cluster.

In 312, after the system has run for each cluster, behavioral information from interactions on devices of the multiple versions of the cluster are associated with the particular user.

Figure 4:
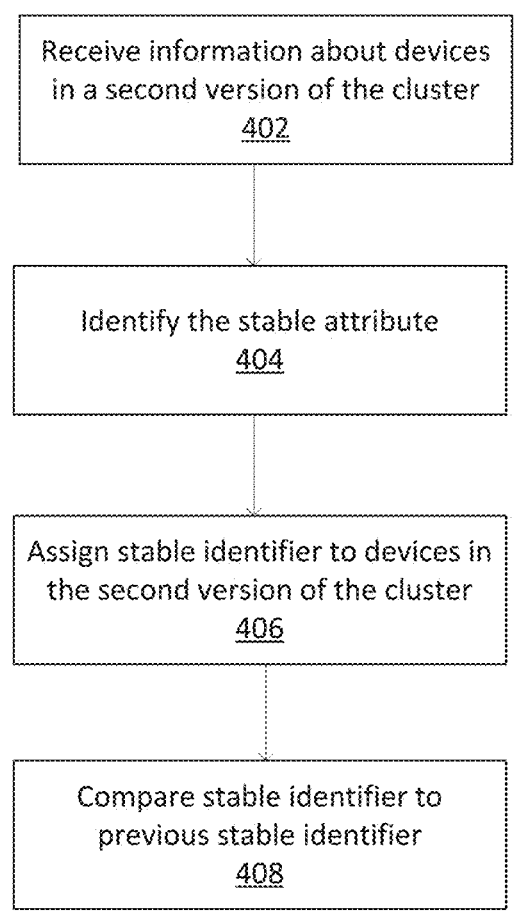
FIG. 4 is a flowchart of an exemplary process for assigning a stable cluster identifier to devices in a second version of the cluster.

FIG. 4 is a flowchart of an exemplary process 400 for assigning a stable identifier to devices in a second version of the cluster. Over time, the devices used by a user change. One advantage of certain of the techniques disclosed herein is that a cluster of devices is quickly associated with the user at any snapshot in time without requiring records of past user behavior to be stored and analyzed. Because the cluster identifier is based on the stable attribute of the stable device, comparing the new stable identifier to the previous stable identifier indicates whether the new cluster is associated with the same user or a different user.

FIG. 4 starts after a stable attribute has been identified in FIG. 3.

In 402, information is received about devices in a second version of the cluster. The information includes various attributes including, as discussed above, IP address, the location of the device, hardware characteristics of the device, date a CRM profile was created, timestamp of the first or last user authentication, the number of authentications on that device, etc.

In 404, a stable attribute is identified for each cluster by evaluating the attributes for each device received in 402. Similar to 304, the stable attribute is identified based on the stable attribute being more likely than another to be present in subsequent cluster device information for the same particular user. The rules for determining the attribute that is the most stable can vary for each implementation.

In 406, a cluster identifier is assigned for the second version of the cluster based on the stable attribute of the stable device.

In 408, analytics data that is collected for the devices in the second version of the cluster is associated with the cluster identifier. Because analytics data collected for the devices of the earlier version of the cluster was also associated with the same cluster identifier, all of the analytics data is associated with the same user without ever having to compare or otherwise match the devices in the first version of the cluster with the devices in the second version of the cluster.

Figure 5:
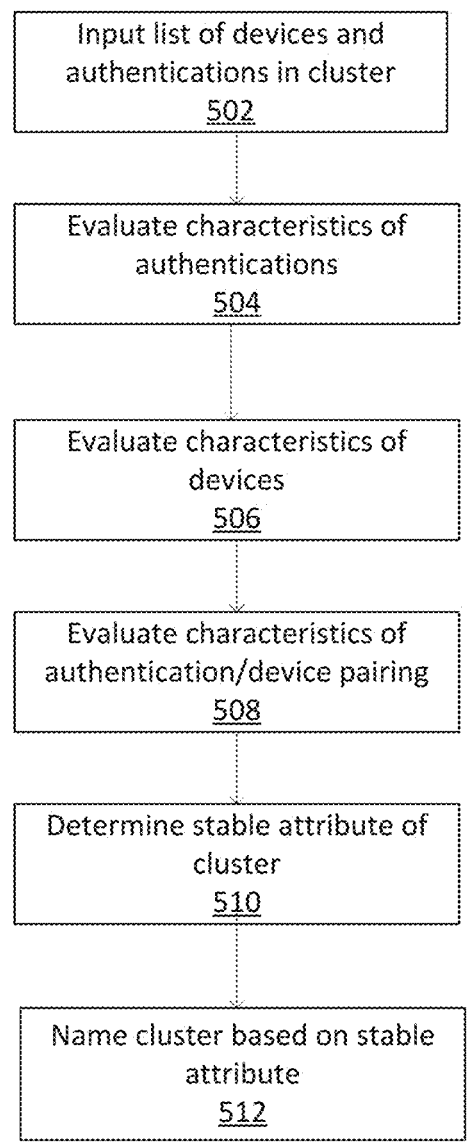
FIG. 5 is a flowchart of an exemplary process for naming a cluster for the stable attribute of the cluster.

FIG. 5 is a flowchart of an exemplary process 500 for the identification of a cluster. In 502, the list of devices and authentications in each cluster is input. In 504, the characteristics of the authentications are evaluated, including the date a CRM profile was created, verification of a user name and password combination, the sender of an email, information contained in a cookie, or information sent from an application running on the user's device. In 506, the characteristics specific to the devices are evaluated, such as IP address, the location of the device, hardware characteristics of the device, software running on the device, etc. In 508, characteristics of the authentication/device pairings are evaluated. These characteristics include the number of authentications on that device, the time stamp of an authentication on the particular device, etc. In 510, the stable attribute of the cluster is determined, based on the results from 504, 506, and 508. In 512, the clusters are named based on the stable attribute identified in 510.

Figure 6:
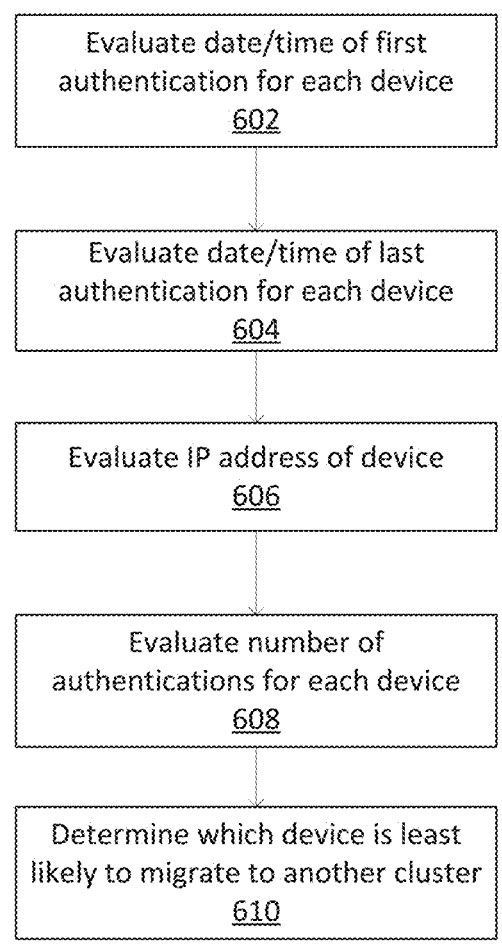
FIG. 6 is a flowchart of an exemplary process for the evaluation of the behavioral information and devices in a cluster.

FIG. 6 is a flowchart of an exemplary process 500 for the evaluation of the behavioral information and devices in a cluster based on specific attributes. FIG. 6 represents one approach to determining the most stable device. In 602, the date/time of the first authentication for each device in the cluster is evaluated. In 604, the date/time of the last, or most recent, authentication for each device in the cluster is evaluated. In 606, the IP address of each device is evaluated. In 608, the number of authentications for each device in the cluster is evaluated. In 610, the results of 602, 604, 606, and 608 are used to determine which device is least likely to migrate to another cluster.

Figure 7:
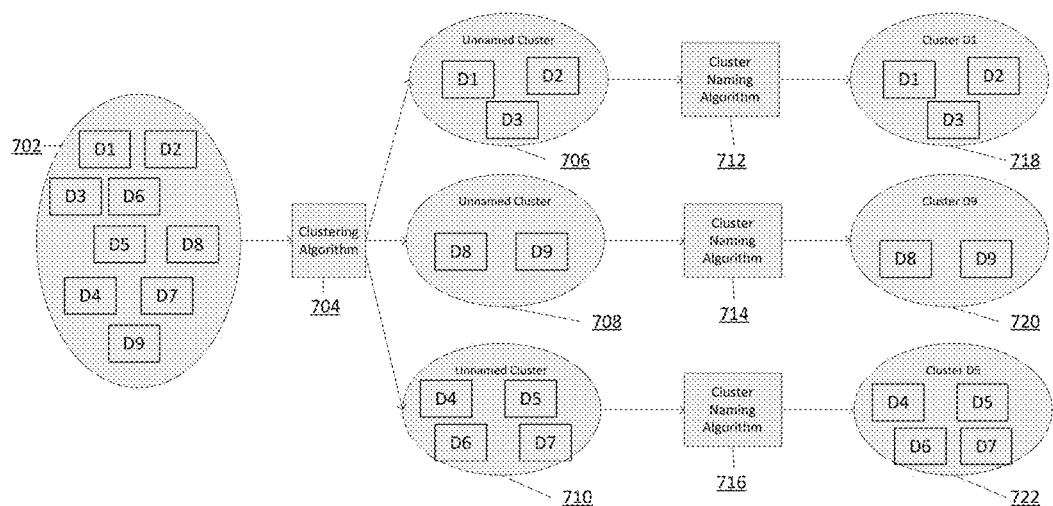
FIG. 7 is a diagram depicting the assigning of devices to clusters.

FIG. 7 is a diagram indicating the assigning of devices to clusters. In 702, information is received from nine devices: D1, D2, D3, D4, D5, D6, D7, D8, and D9. In 704, a clustering algorithm is employed to assign the devices to clusters. After the clustering algorithm is executed, the result is three clusters: 706, 708, and 710. At this point, the clusters have not been named with a cluster identifier. The first cluster, 706, contains devices D1, D2, and D3. The second cluster, 708, contains devices D8 and D9. The third cluster, 710, contains devices D4, D5, D6, and D7.

Next, the Cluster Naming Algorithm is applied and the clusters are named with a cluster identifier. Cluster 706 is run through Cluster Naming Algorithm 712. The result is that D1 is determined to be the most stable device, therefore the cluster is named D1 (the device name of the stable device), as shown in 718. Cluster 708 is run through Cluster Naming Algorithm 714. The result is that D9 is determined to be the most stable device, therefore the cluster is named D9, as shown in 720. Cluster 710 is run through Cluster Naming Algorithm 716. The result is that D5 is determined to be the most stable device, therefore the cluster is named D5, as shown in 722.

Figure 8:
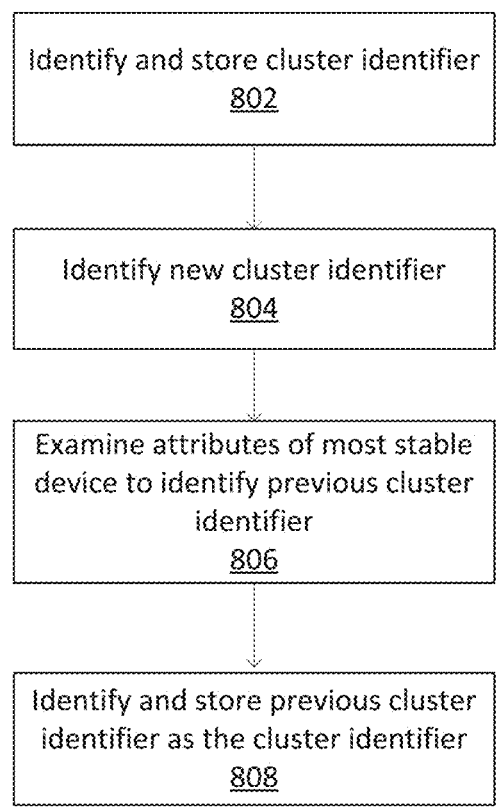
FIG. 8 is a flowchart of an exemplary process for naming a cluster for the stable attribute of a previous version of the cluster.

FIG. 8 is a flowchart of an exemplary process for naming a cluster for the stable attribute of a previous version of the cluster. In later applications of the clustering algorithm, the previously determined Cluster Identifier is used even if the device previously identified as being the most stable is no longer present in the cluster. The most stable device may no longer be present for various reasons, for example, the device may have gone out of service, the device may be temporarily offline, or the device may have been loaned to another user.

The process starts with identifying a cluster identifier in 802. The cluster identifier is identified as described above based on the attributes of the devices in the cluster. In one example, for many iterations, a cluster has devices D1, D2, and D3 and has a cluster identifier of D1 based on D1 being the oldest, stablest device. During those iterations, metadata is stored for each of the devices that says that the prior cluster identifier is D1. Therefore, the prior cluster identifier of D1 is D1, the prior cluster identifier of D2 is D1, and the prior cluster identifier of D3 is also D1.

In 804, a new cluster identifier is identified for each device based on the attributes of the devices in the cluster during this iteration. Following the example used in 802, D1 is not present in this version of the cluster. The clustering algorithm now contains devices D2, D3, and D9, where D9 is a new device. The clustering algorithm determines that D2 is the most stable device in this version of the cluster.

In 806, the clustering algorithm looks at the attributes of D2 to determine what cluster D2 was previously assigned to. The clustering algorithm does this to maintain continuity in the cluster identifier, so that the user will be recognized as the same user. In doing so, the clustering algorithm recognizes the prior cluster identifier D1 in the attributes of D2.

In 808, the new version of the cluster is named D1 even though D1 is no longer in the cluster. Therefore, the cluster identifier D1 is stored in the attributes for D2, D3, and D9. Using the information about previously determined Cluster Identifiers in the selection of a current Cluster Identifier allows the clusters to remain stable even after the most stable devices are gone.

Figure 9:
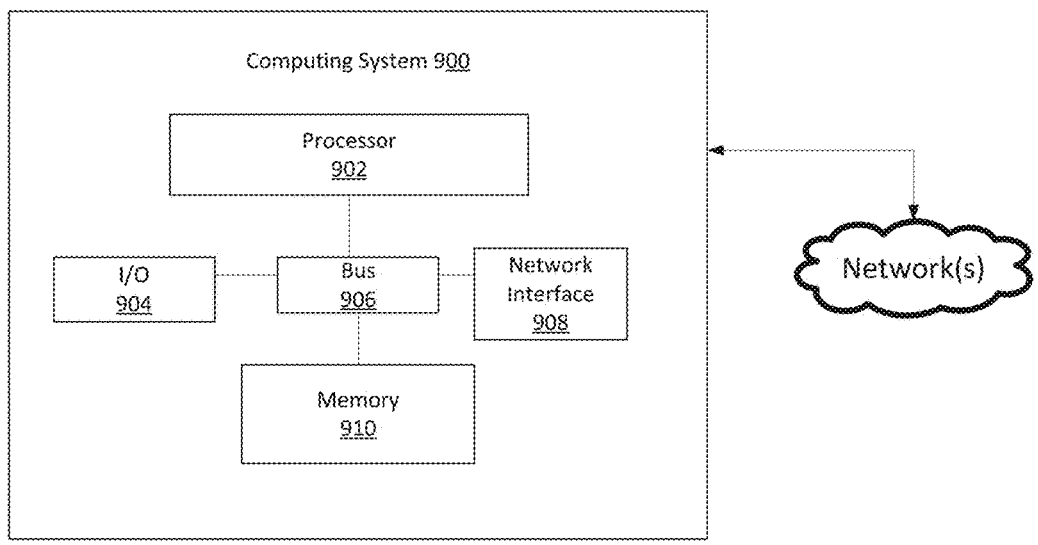
FIG. 9 is a block diagram depicting an example computing system.

Any suitable device or set of computing devices can be used to execute the tool described herein. For example, FIG. 9 is a block diagram depicting an example of a computing system 900. Although this figure depicts a single computing system for illustrative purposes, any number of servers or other computing devices can be included in a computing system. For example, a computing system may include multiple computing devices configured in a grid, cloud, or other distributed computing system that executes the cluster identification application.

The computing system 900 can include a processor 902 that is communicatively coupled to a memory 910 and that executes computer-executable program instructions and/or accesses information stored in the memory 910. The computing system 900 may incorporate multiple processors, as used in distributed computing. The computing system 900 can also include a graphics processing unit. The processor 902 can include one or more microprocessors, one or more application-specific integrated circuits, or one or more other suitable processing devices. The processor 902 can include any of a number of processing devices, including one processor. The processor 902 can include or be in communication with a memory 910 that stores program code. When executed by the processor 902, the program code causes the processor to perform the operations described herein.

The memory 910 can include any suitable computer-readable medium. The computer-readable medium can include any electronic, optical, magnetic, or other storage device capable of providing a processor with computer-readable program code. Non-limiting examples of a computer-readable medium include a CD-ROM, DVD, magnetic disk, memory chip, ROM, RAM, an ASIC, a configured processor, optical storage, magnetic tape or other magnetic storage, or any other medium from which a computer processor can read instructions. The program code may include processor-specific instructions generated by a compiler and/or an interpreter from code written in any suitable computer-programming language, including, for example, C, C++, C#, Visual Basic, Java, Python, Perl, JavaScript, Scala, and ActionScript.

The computing system 900 may also include, or be communicatively coupled with a number of external or internal devices, such as input or output devices. For example, the computing system 900 is shown with an input/output ("I/O") interface 904 that can receive input from input devices or provide output to output devices. A bus 906 can also be included in the computing system 900. The bus 906 can communicatively couple one or more components of the computing system 900.

The computing system 900 can execute program code. The program code may be resident in any suitable computer-readable medium and may be executed on any suitable processing device. The program code can reside in the memory 910 at the computing system 900. The program code stored in the memory 910 can configure the processor 902 to perform the operations described herein.

The computing system 900 can also include at least one network interface 908. The network interface 908 can include any device or group of devices suitable for establishing a wired or wireless data connection to one or more data networks. Non-limiting examples of the network interface 908 include an Ethernet network adapter, a modem and/or the like.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The devices in a cluster can be any combination of desktop computers, laptop computers, notebooks, mobile devices, or any other type of electronic device used to connect to the internet.

Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The analytical system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the operations presented in the examples above can be varied—for example, operations can be re-ordered, combined, and/or broken into sub-blocks. Certain operations or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Each of the disclosed aspects, examples, or features may be combined with one or more of the other aspects, examples, or features. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
   receiving information about devices, wherein the information comprises, for each device, metadata for each of a plurality of attributes;
   selecting, from the information about the devices and for each device, an attribute comprising one or more of (i) a length of time a device has a particular IP address, (ii) an age of a timestamp of authentication of a user, (iii) an amount of time passed since a customer relationship management (CRM) profile was created, or (iv) a number of times the user was authenticated on a device;
   determining a stability rank for each device by ranking the devices according to respective metadata for the selected attribute;
   identifying a device as a stable device based on the device having a stability rank greater than the stability ranks of other devices;
   grouping the devices into a cluster by assigning a cluster identifier to each of the devices in the cluster based on the selected attribute of the stable device; and
   tracking, based on the cluster identifier, user interactions on the devices in the cluster over a plurality of time intervals.

2. The method of claim 1 further comprising:
   receiving information about devices in an additional version of the cluster;
   determining, from the information about the devices in the additional version of the cluster, an additional attribute;
   determining an additional stability rank for each device by ranking the devices according to respective metadata for the additional attribute;
   identifying a second device as a stable device, based on the second device having an additional stability rank greater than the additional stability ranks of the other devices; and grouping the devices into an additional cluster by assigning an additional cluster identifier to the devices in the additional version of the cluster based on the additional attribute of the second device.

3. The method of claim 2, further comprising associating behavioral information from interactions on devices of both the cluster and the additional version of the cluster with a particular user.

4. The method of claim 1 further comprising storing the cluster identifier as metadata for each of the devices of the cluster.

5. The method of claim 1 further comprising:
storing the cluster identifier from a first version of the cluster as metadata for each of the devices of the cluster;
receiving information about devices in a second version of the cluster; and
assigning the cluster identifier to the devices in the second version of the cluster based on the stable device.

6. The method of claim 1, wherein the information received about the devices in the cluster includes a date each of the devices was first detected and the stable device was detected first.

7. The method of claim 1, wherein:
the stable device has a timestamp of authentication that is older than timestamps of authentication of the other devices.

8. The method of claim 1, wherein:
the stable device has an amount of time passed since a CRM profile was created that is longer than amounts of time passed since a CRM profile was created on the other devices.

9. The method of claim 3, wherein the particular user is anonymous.

10. A system comprising:
a processor; and
a memory device communicatively coupled to the processor,
wherein the processor is configured to execute instructions included in the memory device to perform operations comprising:
  receiving information about devices, wherein the information comprises, for each device, metadata for each of a plurality of attributes;
  selecting, from the information about the devices and for each device, an attribute comprising one or more of (i) a length of time a device has a particular IP address, (ii) an age of a timestamp of authentication of a user, (iii) an amount of time passed since a customer relationship management (CRM) profile was created, or (iv) a number of times the user was authenticated on a device;
  determining a stability rank for each device by ranking the devices according to respective metadata for the selected attribute;
  identifying a device as a stable device based on the device having a stability rank greater than the stability ranks of other devices;
  grouping the devices into a cluster by assigning a cluster identifier to each of the devices in the cluster based on the selected attribute of the stable device; and
  tracking, based on the cluster identifier, user interactions on the devices in the cluster over a plurality of time intervals.

11. The system of claim 10, the operations further comprising:
receiving information about devices in an additional version of the cluster;
determining, from the information about the devices in the additional version of the cluster, an additional attribute;
determining an additional stability rank for each device by ranking the devices according to respective metadata for the additional attribute;
identifying a second device as a stable device, based on the second device having an additional stability rank greater than the additional stability ranks of the other devices; and
grouping the devices into an additional cluster by assigning an additional cluster identifier to the devices in the additional version of the cluster based on the additional attribute of the second device.

12. The system of claim 11, the operations further comprising associating behavioral information from interactions on devices of both the cluster and the additional version of the cluster with a particular user.

13. The system of claim 10 further comprising storing the cluster identifier as metadata for each of the devices of the cluster.

14. The system of claim 10, the operations further comprising:
storing the cluster identifier from a first version of the cluster as metadata for each of the devices of the cluster;
receiving information about devices in a second version of the cluster; and
assigning the cluster identifier to the devices in the second version of the cluster based on the stable device.

15. The system of claim 10, wherein the information received about the devices in the cluster includes a date each of the devices was first detected and the stable device was detected first.

16. A non-transitory computer-readable medium embodying program code executable by a computer system, the non-transitory computer-readable medium comprising:
program code for receiving information about devices, wherein the information comprises, for each device, metadata for each of a plurality of attributes;
program code for selecting, from the information about the devices and for each device, an attribute, comprising one or more of (i) a length of time a device has a particular IP address, (ii) an age of a timestamp of authentication of a user, (iii) an amount of time passed since a customer relationship management (CRM) profile was created, or (iv) a number of times the user was authenticated on a device;
program code for determining a stability rank for each device by ranking the devices according to respective metadata for the selected attribute;
program code for identifying a device as a stable device based on the device having a stability rank greater than the stability ranks of other devices;
program code for grouping the devices into a cluster by assigning a cluster identifier to each of the devices in the cluster based on the selected attribute of the stable device; and
program code for tracking, based on the cluster identifier, user interactions on the devices in the cluster over a plurality of time intervals.

17. The non-transitory computer-readable medium of claim 16, further comprising:
program code for receiving information about devices in an additional version of the cluster;

program code for determining, from the information about the devices in the additional version of the cluster, an additional attribute;

program code for determining an additional stability rank for each device by ranking the devices according to respective metadata for the additional attribute;

program code for identifying a second device as a stable device, based on the second device having an additional stability rank greater than the additional stability ranks of the other devices;

program code for grouping the devices into an additional cluster by assigning an additional cluster identifier to the devices in the additional version of the cluster based on the additional attribute of the second device.

18. The non-transitory computer-readable medium of claim 17, further comprising program code for associating behavioral information from interactions on devices of both the cluster and the additional version of the cluster with a particular user.

19. The non-transitory computer-readable medium of claim 16 further comprising program code for storing the cluster identifier as metadata for each of the devices of the cluster.

20. The non-transitory computer-readable medium of claim 16 further comprising:

program code for storing the cluster identifier from a first version of the cluster as metadata for each of the devices of the cluster;

program code for receiving information about devices in a second version of the cluster; and program code for assigning the cluster identifier to the devices in the second version of the cluster based on the stable device.

* * * * *